(No Model.)

C. R. CURTIS.
HOOK FOR CHECK REINS.

No. 480,715. Patented Aug. 16, 1892.

Witnesses

Inventor
Charles R. Curtis.
By his Attorney
Herbert W. Jenner.

UNITED STATES PATENT OFFICE.

CHARLES R. CURTIS, OF FAIRLAND, MICHIGAN.

HOOK FOR CHECKREINS.

SPECIFICATION forming part of Letters Patent No. 480,715, dated August 16, 1892.

Application filed March 5, 1892. Serial No. 423,855. (No model.)

*To all whom it may concern:*

Be it known that I, CHARLES R. CURTIS, a citizen of the United States, residing at Fairland, in the county of Berrien and State of Michigan, have invented certain new and useful Improvements in Hooks for Checkreins; and I do hereby declare the following to be a full, clear, and exact description of the invention, such as will enable others skilled in the art to which it appertains to make and use the same.

This invention relates to hooks specially adapted for holding the checkreins of horses; and it consists in the novel construction and combination of the parts hereinafter fully described and claimed.

Figure 1:
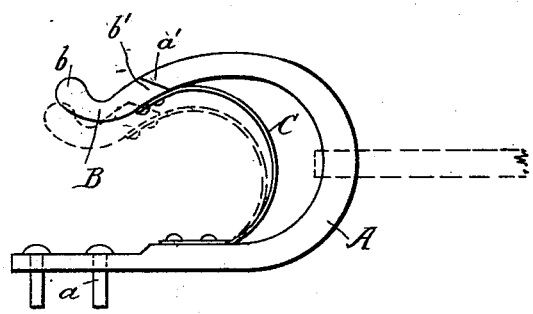
Figure 2:
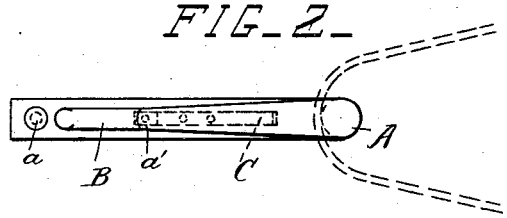

In the drawings, Figure 1 is a side view of the hook, and Fig. 2 is a plan view of the same.

A is the main portion of the hook, provided with means—such as rivets $a$—for securing it to the saddle or other portion of the harness.

The hook A is provided with a beveled end $a'$, and B is an extension-piece provided with a beveled end $b'$, which abuts against the end $a'$. The extension-piece is supported by a spring C, secured to the shank of the hook A and preferably curved in the same direction as the bend of the hook. A lobe $b$ is formed at the end of the extension-piece, and the checkrein is caused to engage with the hook by pressing it against the lobe $b$ until the spring and extension-piece are forced back to the position indicated by the dotted lines in Fig. 1. The checkrein is then slid through the gap between the ends $a'$ and $b'$. The spring is strong enough to prevent the checkrein from slipping off the hook when the horse tosses his head.

The rein can be disengaged from the hook with one hand by sliding it between the ends $a'$ and $b'$ against the pressure of the spring.

What I claim is—

The combination, with a hook provided with a beveled end, of an extension-piece provided with a beveled end and a projecting lobe and a spring secured to the extension-piece and to the shank of the hook and curved in the same direction as the hook, substantially as set forth, whereby the rein may be slipped between the two beveled ends after pressing it against the said lobe.

In testimony whereof I affix my signature in presence of two witnesses.

CHARLES R. CURTIS.

Witnesses:
   W. K. DIX,
   B. E. O'HARA.